United States Patent [19]

Miyazaki et al.

[11] Patent Number: 4,943,614

[45] Date of Patent: Jul. 24, 1990

[54] COATING COMPOSITION

[75] Inventors: Nobuyuki Miyazaki; Masao Unoki, both of Yokohama; Seiji Munekata, Tokyo, all of Japan

[73] Assignee: Asahi Glass Company Ltd., Tokyo, Japan

[21] Appl. No.: 260,040

[22] Filed: Oct. 20, 1988

[30] Foreign Application Priority Data

Oct. 20, 1987 [JP] Japan ................................ 62-262753

[51] Int. Cl.$^5$ ................................................ C08F 8/32
[52] U.S. Cl. ..................................... 525/117; 525/123; 525/160; 525/169; 525/326.2; 525/326.3; 525/368; 525/372; 526/264
[58] Field of Search ................ 526/264; 525/117, 123, 525/160, 164, 368, 372

[56] References Cited

U.S. PATENT DOCUMENTS 2,081,727  2/1982  Yamabe et al. .
4,433,111  2/1984  Tighe et al. .......................... 526/264

*Primary Examiner*—Bernard Lipman
*Attorney, Agent, or Firm*—Oblon, Spivak, McClelland, Maier & Neustadt

[57] ABSTRACT

A coating composition comprising a fluorine-containing copolymer obtained by copolymerizing a fluoroolefin, an N-vinyl-lactam, a monomer having a cross-linkable functional group and other monomers copolymerizable therewith in a proportion of from 30 to 70 mol%, from 5 to 68 mol%, from 2 to 40 mol% and from 0 to 63 mol%, respectively.

17 Claims, No Drawings

COATING COMPOSITION

The present invention relates to a fluoropolymer coating composition having excellent weather resistance.

Heretofore, a coating composition containing, as an essential component, a solvent-soluble fluorine-containing copolymer containing hydroxyl groups has been known as a coating composition capable of providing a coating layer having excellent weather resistance. For example, Japanese Unexamined Pat. Publications No. 34107/1982 and No. 136662/1983 disclose a solvent-soluble fluorine-containing copolymer useful as an essential component of a coating composition, and a coating composition containing such a fluorine-containing copolymer.

With conventional weather resistant coating layers, there have been pointed out some problems such that when they are exposed to rain and wind, contaminants in the rain or in muddy water are likely to leave stains in a pattern of spots or streaks on the surface of the coating layers, whereby the outer appearance of the coating layers is impaired. Such stains can not easily be removed by simple washing with water. On the other hand, it is known to eliminate such problem of stains by forming a coating film of a hydrophilic acrylic resin. However, such a coating film has problems that the water resistance and weather resistance are very poor.

It is an object of the present invention to provide a coating composition capable of providing a coating layer having excellent weather resistance and being free from a deterioration of the outer appearance by rain and wind.

The present invention has been made to solve the above-mentioned problems and provides a coating composition comprising a fluorine-containing copolymer obtained by copolymerizing a fluoroolefin, an N-vinyl-lactam, a monomer having a cross-linkable functional group and other monomers copolymerizable therewith in a proportion of from 30 to 70 mol%, from 5 to 68 mol%, from 2 to 40 mol% and from 0 to 63 mol%, respectively.

Now, the present invention will be described in detail with reference to the preferred embodiments.

In the present invention, as the fluoroolefin, there may be preferably employed a fluoroolefin having from about 2 to about 4 carbon atoms such as tetrafluoroethylene, chlorotrifluoroethylene, trifluoroethylene, vinylidene fluoride, hexafluoropropylene or pentafluoropropylene. Particularly, tetrafluoroethylene, chlorotrifluoroethylene or hexafluoropropylene is preferred.

The N-vinyl-lactam is an organic cyclic compound containing an atomic group of

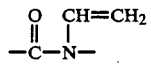

in its ring. Specific examples include, for example, N-vinyl-$\beta$-propiolactam, N-vinyl-2-pyrrolidone, N-vinyl-$\gamma$-valerolactam, N-vinyl-2-piperidone, N-vinyl-$\epsilon$-caprolactam and N-vinyl-heptolactam. The compound having a too large ring can not sufficiently exhibit the hydrophilic properties, and an N-vinyl-lactam having an at most 7-membered lactam ring is preferred. Particularly preferred is N-vinyl-2-pyrrolidone from the viewpoint of the copolymerizability with an fluoroolefin and the stability of the product.

As the cross-linkable functional group in the monomer having such a group, there may be mentioned an active hydrogen-containing group such as a hydroxyl group, a carboxylic acid group, an amino group or an acid amide group, an epoxy group, a halogen-containing group, a double bond or a hydrolyzable silyl group. Among them, the active hydrogen-containing group is preferred from the viewpoint of the reactivity with an isocyanate type curing agent or an aminoplast type curing agent which is usually used as a curing agent for coating. Particularly preferred is a hydroxyl group. As the monomer having the cross-linkable functional group, there may be mentioned a hydroxyalkyl vinyl ether, a hydroxyalkyl allyl ether, a hydroxyalkyl vinyl ether or a reaction product of a hydroxyalkyl allyl ether with a lactone or with an anhydrous dicarboxylic acid, a reaction product of glycidyl vinyl ether or glycidyl allyl ether with phenol, a reaction product of glycidyl vinyl ether, glycidyl allyl ether, an aminoalkyl vinyl ether, an acrylic acid amide or a hydroxyalkyl vinyl ether with an isocyanate alkylmethacrylate, or an allyl vinyl ether. Among them, a compound selected from the group consisting of the above-mentioned vinyl ether, allyl ether, vinyl ester, allyl ester, acrylate and methacrylate is preferably employed from the viewpoint of the excellent copolymerizability with the fluoroolefin and the N-vinyl-lactam. Further, the cross-linkable functional group may be converted to other cross-linkable functional group by a polymer reaction after production of the polymer.

Further, the specific fluorine-containing copolymer in the present invention may be a copolymer obtained by copolymerizing the above-mentioned fluoroolefin, N-vinyl-lactam and monomer having a cross-linkage funcitonal group, and other monomers copolymerizable therewith. Such other monomers include, for example, an alkyl vinyl ether, an alkyl vinyl ester, an alkyl allyl ether, a fluoroalkyl vinyl ether, an acrylate and a methacrylate. Preferred is a vinyl ether, a vinyl ester or an allyl ether which has excellent copolymerizability with the fluoroolefin or the like. Particularly preferred is a vinyl ether, a vinyl ester or an allyl ether which has a straight chain, branched or alicyclic $C_2$–$C_{15}$ alkyl group. Further, the alkyl group may be substituted at least partly by fluorine atoms. Such other copolymerizable monomers may be copolymerized for the purpose of improving the gloss and the flexibility of the coating layer, or the dispersibility of a pigment in a paint composition, as the case requires.

The specific fluorine-containing copolymer in the present invention is a copolymer obtained by copolymerizing the fluoroolefin, the N-vinyl-lactam, the monomer having a cross-linkable functional group and such other monomers copolymerizable therewith in a proportion of from 30 to 70 mol%, from 5 to 68 mol%, from 2 to 40 mol% and from 0 to 63 mol%, respectively. Further, it is preferred to use said other copolymerizable monomers in a proportion of from 1 to 63 mol% for improving various physical properties of the coating layer such as the gloss, the flexibility and the dispersibility of a pigment. If the proportion of the copolymerized fluoroolefin is too small, it is difficult to obtain sufficiently excellent weather resistance as a weather resistant coating material. Further, if it is too large, the solubility to a solvent tends to be low, or the coating properties of the coating material tend to deteriorate. If the amount of the N-vinyl-lactam is too small, no adequate effect for improvement of the present invention is obtainable, and if it is too large, the weather resistance and the water resistance of the coating material tend to deteriorate, such being undesirable. Further, if the amount of the monomer having a cross-linkable functional group is too small, no adequate cross-linking density is obtainable and the solvent resistance of the coating layer tends to be low, such being undesirable. If it is too large, there are problems such that the storage stability of the coating material tends to deteriorate, the working life of the coating material tends to be short and the coating layer tends to harden.

Further, the specific fluorine-containing copolymer of the present invention is preferably a copolymer having an intrinsic viscosity (hereinafter referred simply as [η]) of from 0.05 to 4.0 dl/g in tetrahydrofuran at a temperature of 30° C. in a non-cured state. If a copolymer having [η] of less than the above identified value is used for coating, an adequate coating layer tends to be hardly obtained. Further, if a copolymer having [η], of more than the above identified value is used for coating, handling of the coating material tends to be difficult.

For the preparation of the specific fluorine-containing copolymer of the present invention, it is possible to employ various polymerization methods such as bulk polymerization, suspension polymerization, emulsion polymerization and solution polymerization, and a catalytic polymerization method by using a free radical initiator, an ionizing radiation polymerization method or a redox polymerization method may optionally be employed.

Further, the fluorine-containing copolymer of the present invention may be a copolymer in which the lactam moiety is hydrolyzed. When the lactam moiety is hydrolyzed, a secondary amino group and a carboxylic acid group are formed, and the hydrophilic property becomes very high, whereby it becomes possible to apply the coating material for an electrodeposition paint or water paint.

The composition of the present invention preferably contains a curing agent. Such a curing agent may be, for example, an aminoplast, a multivalent isocyanate, an epoxy group-containing compound, a polybasic acid or its anhydride, metal alkoxide or derivative which can react with a cross-linkable functional group of the fluorine-containing copolymer. Aminoplasts and multivalent isocyanates are preferably employed from the viewpoint of the weather resistance or the like. The aminoplasts include, for example, a melamine resin, a urea resin, a benzoguanamine resin and an acetoguanamine resin. The multivalent isocyanates include, for example, hexamethylene diisocyanate, tetramethylene diisocyanate, isophorone diisocyanate, tolylene diisocyanate, xylidene diisocyanate, hexamethylene diisocyanate cyclic trimer, and condensation trimer of 3 mol hexamethylene diisocyanate and 1 mol water. Further, as the multivalent isocyanates, blocked multivalent isocyanates which are blocked by blocking agents such as alcohols, phenols, oximes or amines, may be employed. The mixing amount of the curing agent is preferably an amount so that number of functional groups of the curing agent/number of cross-linkable functional groups of the fluorine-containing copolymer is at a level of from 0.5 to 1.5. If the amount of the curing agent is too small, the mechanical properties and the chemical resistance of the coating layer tend to deteriorate, and if it is too large, the weather resistance of the coating layer tends to deteriorate due to the residual unreacted functional groups in the cured coating layer.

It is preferred that the composition of the present invention contains a solvent for the efficiency of coating operation or the like. Such a solvent includes aromatic hydrocarbons such as xylene and toluene, alcohols such as n-butanol, esters such as butyl acetate, ketones such as methyl isobutyl ketone, glycol ethers such as ethyl cellosolve and commercially available various thinners. It is also possible to use these solvents in combination at various proportions. It is preferred that such an organic solvent is optionally selected by taking into accounts the state of the substrate to be coated, the evaporation rate of the solvent, the operation environment and the like.

The mixing of the coating composition of the present invention can be conducted by means of various machines which are commonly employed for the preparation of coating materials, such as a ball mill, a paint shaker, a sand mill, a jet mill, a three-roll mill and a kneader. At that time, a pigment, a dispersion stabilizer, a viscosity controlling agent, a leveling agent, an antigelation agent or an ultraviolet absorber may be incorporated.

When the coating composition of the present invention is used as a heat setting type coating material so-called a baking finish coating material, a curing agent such as an amino plast, a polybasic acid or its anhydride, or a blocked multivalent isocyanate is mixed at the same time as the above-mentioned mixing operation, and it is used as a one-component type coating material.

Now, the present invention will be described in detail with reference to Preparation Example, Examples and Comparative Examples. However, it should be understood that the present invention is by no means restricted by such specific Examples.

PREPARATION EXAMPLE

PREPARATION OF FLUORINE-CONTAINING COPOLYMER

Fluroine-containing copolymers A-1 to A-6 and B-1 to B-3 were prepared by reacting monomer mixtures having the compositions as identified in Table 1 in tert-butanol as a solvent at 65° C. for a reaction time of from 7 to 10 hours by using azobisisobutylonitrile as the initiator in a pressure reactor.

TABLE 1

| | Fluorine-containing copolymer | | | | | | | | |
|---|---|---|---|---|---|---|---|---|---|
| | A-1 | A-2 | A-3 | A-4 | A-5 | A-6 | B-1 | B-2 | B-3 |
| Composition (part by weight) | | | | | | | | | |
| CTFE | — | — | 60 | 60 | — | 60 | 50 | 50 | 50 |
| TFE | 60 | 60 | — | — | — | — | — | — | — |
| HFP | — | — | — | — | 60 | — | — | — | — |
| NVP | 32 | 16 | 24 | 32 | 16 | 16 | — | — | — |
| HBVE | 8 | 8 | 8 | 8 | 8 | 8 | 10 | 10 | 10 |
| CHVE | — | — | — | — | — | — | 20 | — | — |
| EVE | — | 8 | 8 | — | 8 | — | 20 | 20 | 40 |

TABLE 1-continued

| | Fluorine-containing copolymer | | | | | | | | |
|---|---|---|---|---|---|---|---|---|---|
| | A-1 | A-2 | A-3 | A-4 | A-5 | A-6 | B-1 | B-2 | B-3 |
| Veova 10 | — | — | — | — | — | 8 | — | 20 | — |
| Solubility of copolymer in methanol | ○ | Δ | ○ | ○ | Δ | Δ | X | X | X |
| [η] (dl/g) | 0.18 | 0.21 | 0.19 | 0.18 | 0.22 | 0.23 | 0.20 | 0.19 | 0.23 |

The abbreviations in Table 1 are as follows:
CTFE: Chlorotrifluoroethylene
TFE: Tetrafluoroethylene
HFP: Hexafluoropropylene
NVP: N-vinyl-2-pyrrolidone
HBVE: ω-hydroxybutyl vinyl ether
CHVE: Cyclohexyl vinyl ether
EVE: Ethyl vinyl ether
Veova 10: Tradename (manufactured by Shell Chemical Company) a vinyl ester of a saturated $C_{10}$ carboxylic acid having a branched structure.

With respect to the solubility of the copolymer in methanol, the case where the copolymer dissolved in methanol was indicated by ○, the case where the copolymer swelled with methanol was indicated by Δ and the case where the copolymer did not dissolve in methanol was indicated by X.

EXAMPLES 1 to 6 and COMPARATIVE EXAMPLES 1 to 3

By using the fluorine-containing copolymer prepared in the above mentioned Preparation Example, a coating layer was formed on an aluminum plate which was subjected to allodine treatment, in the mixing proportion (part by weight) and under the curing condition as identified in Table 2.

The physical properties of the coating layer were measured. The results are shown in Table 3.

TABLE 2

| | Examples | | | | | | Comparative Examples | | |
|---|---|---|---|---|---|---|---|---|---|
| | 1 | 2 | 3 | 4 | 5 | 6 | 1 | 2 | 3 |
| Fluorine-containing copolymer | | | | | | | | | |
| Type | A-1 | A-2 | A-3 | A-4 | A-5 | A-6 | B-1 | B-2 | B-3 |
| Amount | 100 | 100 | 100 | 100 | 100 | 100 | 100 | 100 | 100 |
| Methyl ethyl ketone | 80 | 80 | 80 | 80 | 80 | 80 | 80 | 80 | 80 |
| Cymel 325 | 20 | 20 | 20 | 20 | — | — | 20 | 20 | — |
| Coronate EH | — | — | — | — | 18.5 | 18.5 | — | — | 18.5 |
| Curing condition | 140° C. 30 minutes | 140° C. 30 minutes | 140° C. 30 minutes | 140° C. 30 minutes | 80° C. 30 minutes | 80° C. 30 minutes | 140° C. 30 minutes | 140° C. 30 minutes | 80° C. 30 minutes |

Cymel 325: Melamine type curing agent manufactured by Mitsui Toatsu Chemicals (methylolmelamine)
Coronate EH: Isocyanate type curing agent manufactured by Nippon Polyurethane (hexamethylenediisocyanate cyclic trimer)

TABLE 3

| | Examples | | | | | | Comparative Examples | | |
|---|---|---|---|---|---|---|---|---|---|
| | 1 | 2 | 3 | 4 | 5 | 6 | 1 | 2 | 3 |
| Contact angle of water (deg) | 52 | 65 | 58 | 51 | 68 | 63 | 85 | 80 | 82 |
| Repellency test of water marker | Pass | Pass | Pass | Pass | Pass | Pass | Fail | Fail | Fail |
| Staining test | | | | | | | | | |
| Stain deposition | ⊙ | ○ | ⊙ | ⊙ | ○ | ○ | X | X | X |
| Wiping off efficiency | ⊙ | ○ | ○ | ⊙ | ○ | Δ | Δ | Δ | Δ |
| Weather resistance | 82 | 82 | 90 | 86 | 89 | 80 | 90 | 85 | 91 |
| Adhesive property test by water-based Paint | 100/100 | 100/100 | 100/100 | 100/100 | 100/100 | 100/100 | 0/100 | 0/100 | 0/100 |

The repellency test of water marker, the staining test, the accelerated weather resistance test and the adhesive property test of water-based paint were conducted in the following manners.

Repellency Test of Water Marker

The repellency of water marker was determined in such a manner that a line was drawn on the coating layer by a water marker, whereupon the repellency was evaluated by the following standards:
Pass: No repellency observed.
Fail: Repellency observed.

Staining Test

The stain deposition was determined in such a manner that a dispersion of 0.1 wt% of carbon black in distilled water was sprayed on the coating layer, followed by drying at 90° C. in a drier for 10 minutes. This cycle was repeated 6 times, whereupon the staining state by carbon was evaluated by the following standards:

The stain spreads over the entire surface.
The stain slightly takes a pattern of spots.
Δ The stain takes a pattern of spots.
X: The stain distinctly takes a pattern of spots.

The washing off efficiency was determined in such a manner that after the above stain deposition test, the stained coating surface was wiped with water, whereupon the coating layer surface was evaluated by the following standards:
: No stain remains.
: No substatial stain remains.
ΔStain remains.
X: Stain distinctly remains.

Accelerated Weather Resistance Test

The gloss retention rate (%) after 3,000 hours in the sunshine weatherometer, was measured.

Adhesive Property Test of Water-based Paint

On the coating layer, the water-based paint (tradename for an acryl emulsion type paint Asuka, manufactured by Kansai Paint) was applied and dried, and then, the adhesive property test was conducted in accordance with JIS H8602.

The coating composition of the present invention is capable of forming a coating layer wherein a distinct stain in the pattern of spots or streaks which used to be a problem with the conventional weather resistant coating materials, does not form and a stain can easily be removed, without impairing the weather resistance of a wheather resistant coating material. Further, it is not repellent against a water marker and is also useful for a surface coating of a display board such as a message board. Further, the fluorine-containing copolymer i.e. the main component can be dissolved in a polar solvent such as methanol, and it is possible to form a water paint using a solvent mixed with water. Further, it is excellent in the adhesive properties as a water paint, and when the coaing layer is damaged, it is easy to repair it by the water paint.

What is claimed is:

1. A coating composition comprising of fluorine-containing copolymer obtained by copolymerizing a fluoroolefin having from 2 to 4 carbon atoms, an N-vinyl-lactam, a monomer having a functional group which is cross-linkable with a curing agent selected from the group consisting of an aminoplast, a multivalent isocyanate, an epoxy group-containing compound, a polybasic acid or its anhydride, a metal oxide or derivative thereof capable of cross-linking said copolymers, and other monomers copolymerizable therewith in a proportion of from 30 to 70 mol %, from 5 to 68 mol %, from 2 to 40 mol % and from 0 to 63 mol %, respectively.

2. The coating composition according to claim 1, wherein the N-vinyl-lactam is a lactam having an at most a 7-membered lactam ring.

3. The coating composition according to claim 2, wherein the N-vinyl-lactam is N-vinyl-2-pyrrolidone.

4. The coating composition according to claim 1, wherein the monomer having a cross-linkable functional group is a monomer having one functional group selected from the group consisting of active hydrogen-containing groups, epoxy groups, halogen-containing groups, double bonds and hydrolyzable silyl groups.

5. The coating composition according to claim 4, wherein the active hydrogen-containing group is a hydroxyl group.

6. The coating composition according to claim 4, wherein the monomer having a cross-linkable functional group is one compound selected from the group consisting of vinyl ethers, allyl ethers, vinyl esters, allyl esters, acrylates and methacrylates, which have a cross-linkable functional group.

7. The coating composition according to claim 6, wherein the monomer having a cross-linkable functional group is a hydroxyalkyl vinyl ether.

8. The coating composition according to claim 1, wherein said other copolymerizable monomer is one monomer selected from the group consisting of vinyl ethers, vinyl esters and allyl ethers.

9. The coating composition according to claim 1, wherein said other copolymerizable monomer is one monomer selected from the group consisting of vinyl ethers, vinyl esters and allyl ethers, which have a straight chain, branched or alicyclic $C_2$–$C_{15}$ alkyl group.

10. The coating composition according to claim 1, wherein the fluorine-containing copolymer is obtained by copolymerizing said other copolymerizable monomer in a proportion of from 1 to 63 mol%.

11. The coating composition according to claim 1, wherein the curing agent is one compound selected from the group consisting of aminoplasts and multivalent isocyanates.

12. The coating composition according to claim 1, which comprises a fluorine-containing copolymer obtained by hydrolysis of the lactam group in the fluorine-containing group.

13. The coating composition comprising a fluorine-containing copolymer obtained by copolymerizing a $C_2$–$C_4$ fluoroolefin, an N-vinyl-lactam having an at least a 7-membered lactam ring, a monomer having a cross-linkable functional group selected from the group consisting of an active hydrogen-containing groups, epoxy groups, halogen-containing groups, double bonds and hydrolyzable silyl groups, and at least one copolymerizable monomer selected from the group consisting of vinyl ethers, vinyl esters and allyl ethers, which have a $C_2$–$C_{15}$ straight chain, branched or alicyclic alkyl group in a proportion of from 30 to 70 mol%, from 5 to 68 mol%, from 2 to 40 mol% and from 0 to 63 mol%, respectively, and a curing agent.

14. The coating composition according to claim 13, the N-vinyl-lactam is N-vinyl-2-pyrrolidone.

15. The coating composition according to claim 13, wherein the monomer having a cross-linkable functional group is one compound selected from the group consisting of vinyl ethers, allyl ethers, vinyl esters, allyl esters, acrylates and methacrylates.

16. The coating composition according to claim 13, wherein the active hydrogen-containing group is a hydroxyl group.

17. The coating composition according to claim 13, wherein the curing agent is one compound selected from the group consisting of aminoplasts and multivalent isocyanates.

* * * * *